US012702123B2

(12) United States Patent
Vander Boon

(10) Patent No.: US 12,702,123 B2
(45) Date of Patent: Aug. 11, 2026

(54) VARIABLE DISPLACEMENT FISHING DEVICE THAT RESPONDS TO FLUCTUATING DRAG FORCE IN FLUIDS AT STRIKE

(71) Applicant: SAIP Holdings, LLC, Lowell, MI (US)

(72) Inventor: Calvin Vander Boon, Lowell, MI (US)

(73) Assignee: SAIP Holdings, LLC, Lowell, MI (US)

( * ) Notice: Subject to any disclaimer, the term of this patent is extended or adjusted under 35 U.S.C. 154(b) by 0 days.

(21) Appl. No.: 18/195,035

(22) Filed: May 9, 2023

(65) Prior Publication Data

US 2024/0008466 A1 Jan. 11, 2024

Related U.S. Application Data

(60) Provisional application No. 63/359,768, filed on Jul. 9, 2022.

(51) Int. Cl.
*A01K 91/10* (2006.01)
*A01K 91/06* (2006.01)

(52) U.S. Cl.
CPC .............. *A01K 91/10* (2013.01); *A01K 91/06* (2013.01)

(58) Field of Classification Search
CPC ................................ A01K 91/10; A01K 91/06
USPC .................................................. 43/15, 42.72
See application file for complete search history.

(56) References Cited

U.S. PATENT DOCUMENTS 155,266 A * 9/1874 Sprague ................. A01K 91/10 43/42.72
608,063 A * 7/1898 Mintzer ................. A01K 91/10 43/44.93
711,318 A * 10/1902 Hymers ................. A01K 91/10 43/15
1,250,053 A * 12/1917 Tukey .................... A01K 91/06 59/95
1,295,448 A * 2/1919 Dingwell ............... A01K 91/10 43/42.49
1,383,474 A * 7/1921 Lucas .................... A01K 85/16 43/15
1,444,876 A * 2/1923 Hanson ................... F16G 15/08 59/95

(Continued)

FOREIGN PATENT DOCUMENTS

CN 110115254 A * 8/2019
DE 843758 C * 3/1953

(Continued)

OTHER PUBLICATIONS

International Search Report and Written Opinion, received from the International Searching Authority, for International Application No. PCT/US23/26289, mailed on Nov. 15, 2023, pp. 1-30.

*Primary Examiner* — Darren W Ark

(74) *Attorney, Agent, or Firm* — Wood, Phillips, Katz, Clark & Mortimer

(57) ABSTRACT

The present invention comprises a novel strike assist device that aids in the catching of fish. The strike assist device comprises a body that attaches to a fishing line, a displacement element that attaches to the body, and a leader which connects the displacement element to a lure or bait. The various elements of the strike assist device are each configured to allow the lure or bait to be displaced towards a fish strike to aid in securely hooking the fish.

15 Claims, 4 Drawing Sheets

(56) References Cited

U.S. PATENT DOCUMENTS 1,614,931 A * 1/1927 Pennell .................. A01K 93/02 24/115 R
2,147,917 A * 2/1939 Noren .................. A01K 91/10 177/245
2,153,489 A * 4/1939 Whitis .................. A01K 85/16 43/17.2
2,204,560 A * 6/1940 Allison .................. A01K 91/10 43/15
2,488,475 A * 11/1949 Merritt .................. H01F 29/146 294/82.35
2,530,007 A * 11/1950 Euzent .................. A01K 91/10 43/42.53
2,560,875 A * 7/1951 Knott .................. A01K 91/10 74/2
2,568,999 A * 9/1951 Gunser .................. A01K 91/10 43/15
2,582,758 A * 1/1952 Rose .................. A01K 93/02 43/15
2,606,390 A * 8/1952 Farmer .................. A01K 97/24 43/42.72
2,627,692 A * 2/1953 Goodman .................. A01K 91/06 43/43.12
2,631,399 A * 3/1953 Sowa .................. A01K 93/02 43/44.9
2,731,758 A * 1/1956 Coe .................. A01K 91/06 43/43.1
2,801,487 A * 8/1957 Morgan .................. A01K 91/10 43/15
2,808,673 A * 10/1957 Coughlin .................. A01K 85/16 43/37
3,060,615 A * 10/1962 Spets .................. A01K 91/10 43/15
3,162,969 A * 12/1964 Knott .................. A01K 93/02 43/15
3,174,247 A * 3/1965 Morgan .................. A01K 91/10 43/44.8
3,220,138 A * 11/1965 Greenfield .................. A01K 93/02 43/15
3,314,185 A * 4/1967 Mccoy .................. A01K 91/10 43/15
3,660,922 A * 5/1972 Chill .................. A01K 91/10 43/15
3,693,275 A * 9/1972 Craig .................. A01K 85/00 43/42.35
3,766,679 A * 10/1973 Noe .................. A01K 91/10 43/15
3,766,680 A * 10/1973 Torme .................. A01K 93/02 43/16
3,974,588 A * 8/1976 Blom .................. A01K 85/16 43/15
4,547,990 A * 10/1985 Hero .................. A01K 91/10 43/15
4,681,303 A * 7/1987 Grassano .................. B68B 1/00 267/113
4,794,722 A * 1/1989 Crevoisier .................. A01K 91/06 43/42.72
4,848,020 A * 7/1989 Lash .................. A01K 97/24 43/17.2
5,279,066 A * 1/1994 Camera .................. A01K 91/06 43/44.9
5,309,663 A * 5/1994 Shirley .................. A01K 91/10 43/15
5,438,788 A * 8/1995 Rich .................. A01K 91/10 43/15
5,515,638 A * 5/1996 Shirley .................. A01K 97/00 43/15
5,832,654 A * 11/1998 McQueeny .................. A01K 85/16 43/42.15
5,937,565 A * 8/1999 Maric .................. A01K 93/00 43/44.91
6,006,466 A * 12/1999 Washecka .................. A01K 91/14 43/43.11
6,105,299 A * 8/2000 Rich .................. A01K 91/10 43/42.36
6,158,161 A * 12/2000 Rossman .................. A01K 85/16 43/42.35
6,405,474 B1 * 6/2002 Taunton .................. A01K 91/10 43/44.9
6,481,148 B1 * 11/2002 Lindgren .................. A01K 85/01 362/276
6,678,993 B1 * 1/2004 Long .................. A01K 91/065 43/42.39
6,817,137 B1 * 11/2004 Bella .................. A01K 91/10 43/44.92
7,089,700 B2 * 8/2006 Timbes .................. A01K 87/007 43/25
7,549,249 B2 * 6/2009 Tamian .................. A01K 91/04 267/71
9,545,090 B2 * 1/2017 Drees .................. A01K 91/10
9,596,838 B2 * 3/2017 Brackett, Sr. .................. A01K 91/10
2002/0166282 A1 * 11/2002 Izzard .................. A01K 91/10 43/44.91
2004/0016171 A1 * 1/2004 Waxmanski .................. A01K 91/10 43/15
2007/0289195 A1 * 12/2007 Queen .................. A01K 91/10 43/15
2008/0052980 A1 * 3/2008 Tamian .................. A01K 91/10 43/42.72
2011/0016767 A1 * 1/2011 Flecha .................. A01K 91/10 43/15
2011/0214332 A1 9/2011 Partridge
2012/0144723 A1 6/2012 Davidson
2012/0186135 A1 7/2012 Jones
2015/0282469 A1 * 10/2015 Fizer .................. A01K 93/02 43/17
2016/0015016 A1 * 1/2016 Brackett, Sr. .................. A01K 97/12 43/15
2016/0278356 A1 * 9/2016 Warnke, Sr. .................. A01K 95/00

FOREIGN PATENT DOCUMENTS

EP 0407991 A1 * 1/1991
EP 0497998 A1 * 8/1992
FR 710595 A * 8/1931
FR 1252386 A * 1/1961
JP H0732659 B2 * 4/1995
JP 2015042162 A * 3/2015 .................. A01K 93/00
KR 10-2010-0105815 A 9/2010
NL 1042627 B1 * 5/2019
WO WO-9700009 A1 * 1/1997 .................. A01K 91/10
WO 98/02037 1/1998
WO WO-2005094573 A2 * 10/2005 .................. A01K 91/10

* cited by examiner 40
44
48
52
56
60
64
68
70
72
73
90
100
104
9
10
11

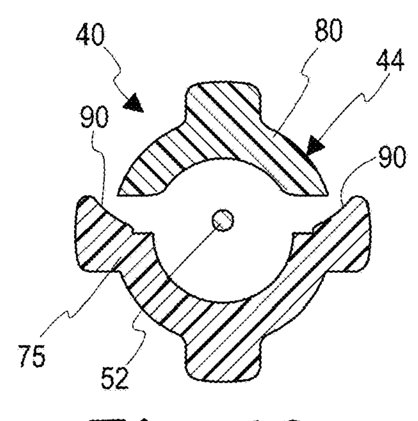
Fig. 10
40
80
44
76
52
Fig. 11
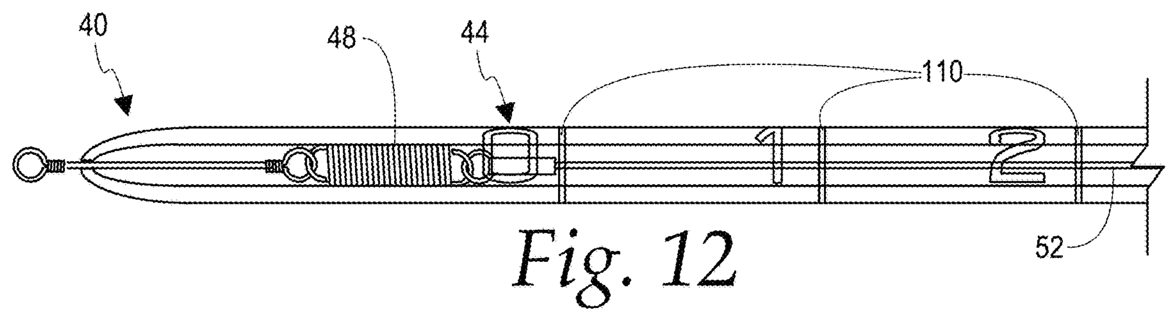
Fig. 12
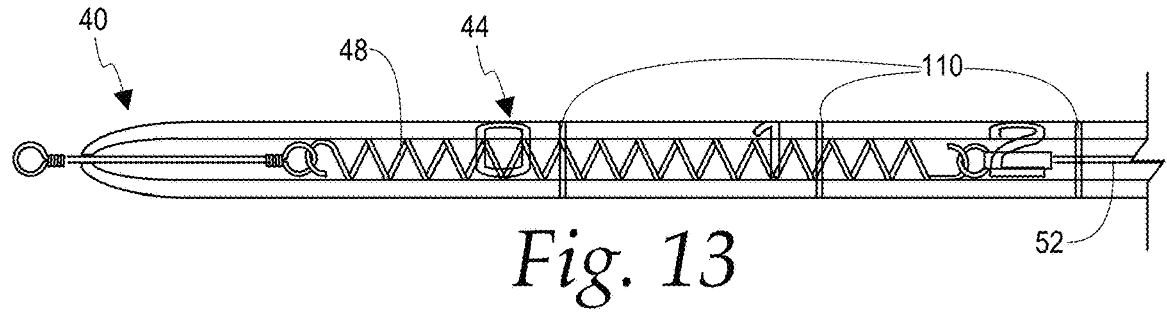
Fig. 13
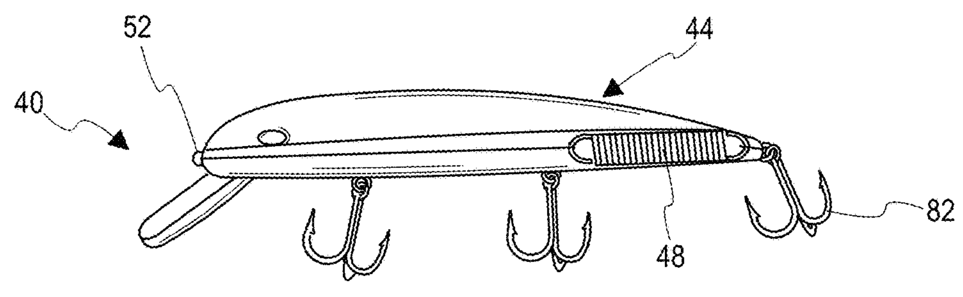
Fig. 14

VARIABLE DISPLACEMENT FISHING DEVICE THAT RESPONDS TO FLUCTUATING DRAG FORCE IN FLUIDS AT STRIKE

PRIORITY

This application claims priority to U.S. provisional application Ser. No. 63/359,768, filed Jul. 9, 2022, the entire contents of which is incorporated herein by reference.

FIELD OF THE INVENTION

The present invention relates to devices used to assist in hooking and catching fish. More particularly, the invention relates to a variable displacement device that allows the lure/bait to vary its displacement in response to fluctuating drag forces caused by a fish's mouth while biting bait.

BACKGROUND OF THE INVENTION AND TECHNICAL PROBLEMS POSED BY THE PRIOR ART

Securely hooking a fish is required for an angler to successfully land a fish. This is often accomplished by enticing a fish to bite (referred to herein as a "strike") at a bait or lure (referred to hereto in as "bait"). Almost all sportfish feed by creating a powerful suction force which draws the prey into their mouth first and then into their stomach. When fish strike, they suck the water immediately in front of them in through their mouth and then expel it out through their gills while directing the ingested prey item down their throat. This feeding technique is known as suction feeding and is well documented through both informal and peer-reviewed sources.

Since fish expect prey to get sucked into their mouth when they strike, many fish that strike at a bait do not get hooked since the tension from the attached fishing line prevents the bait from moving into the fish's mouth as would normally occur when fish feed. This is especially true when an angler is trolling or retrieving the bait since there is no slack in the fishing line and fish usually strike from behind the bait. This means that fish may strike repeatedly at a bait and never get hooked, often without the angler even knowing that the strike(s) occurred.

Therefore, a need exists in the fishing industry and prior art for a device that allows the bait to get sucked into the fish's mouth during a strike, and thereby enhance the chance of a fish becoming securely hooked. This need is enhanced and complicated by the fact that the contemplated device must be carefully calibrated to match the fishing environment. When a fish strikes at bait, the acceleration of suction-ingested volume of water increases the fluid speed relative to the bait, which in turn causes an exponential increase in the drag force experienced by the bait. Changes in the temperature or viscosity of the water, strength, size, and species of the fish, shape and drag-coefficient of the bait, and type of fishing technique are all factors that affect the relative suction and drag forces produced at strike and affect the ability of the strike assist apparatus to function properly. The claimed invention seeks to solve this problem via the calibration of its displacement element.

If the strike-assisting device or apparatus is not calibrated to account for these factors, the strike assist device does not work consistently, and the tension of the attached fishing line prevents the bait from being reliably displaced into a striking fish's mouth. The number and complexity of these calibration factors are a primary reason the fishing industry has tried and failed to previously develop a strike-assisting device. The claimed apparatus seeks to address one or more of these problems associated with suction and drag factors, and therefore may allow anglers to hook more fish during a fishing session.

Collectively, the combination (as described in this patent) of the body, the displacement element, and the leader create an apparatus or device known as a "strike assist."

Other features and advantages of the present invention will be better understood with reference to the accompanying figures and detailed description.

SUMMARY OF THE INVENTION

According to broad aspects of one form of the present invention, the claimed invention is an apparatus for increasing the efficiency of hooking fish that strike on a bait or hook. The present apparatus comprises a variable displacement fishing device that in preferred embodiments generally consists of a body (alternatively referred to herein as a housing), a displacement element (a spring or other device allowing variable displacement or extension of the bait towards the direction of the strike), and a leader. The body of the apparatus may provide an attachment point for the fishing line coming from the fishing user's reel (or other means of retracting the fishing line), serve to house the other apparatus components, reduce drag forces acting on the other components, limit the extension range of the displacement element, and provide the necessary tensile strength to fight a fish once it is hooked. The body is hollow, containing a cavity which in turn contains the displacement element. At least one end of the body has an opening into the center of the cavity.

A first end of the displacement element attaches to the inside of the body's cavity, while the opposite end of the displacement element extends out through the cavity's opening and attaches to a leader outside of the body. Alternatively, the displacement element may lie completely within the body's cavity, and the leader extends through the body's cavity opening.

If a spring is used as the displacement element, the dimensions and strength of the spring may vary based on the bait being towed and the expected fluid velocities the bait may experience. In one configuration of the claimed invention, it is desirable that the displacement element is minimally extended by the drag force the bait experiences while being towed. In an alternative or supplemental configuration, the displacement element needs to have an appropriate extension rate to allow the bait to move a significant distance towards the fish's mouth when it strikes the bait, allowing the fish to become securely hooked.

The leader attaches to the end of the displacement element. The connection between the leader and displacement element may occur outside of the body's cavity or within the body's cavity, depending on if the length of the displacement element protrudes the displacement element out of the body cavity opening.

A bait may be attached directly to the leader of the device or may optionally be attached indirectly by using a length of fishing line to separate the device from the bait. This optional use of fishing line to connect the leader to the bait will be referred hereto in as a "pseudo-leader" and is included in this patent's definition of "bait". This configuration allows the leader to more effectively displace the bait into the fish's mouth at strike, and puts space between the apparatus and bait so the shape of the apparatus does not deter fish from striking the bait.

When a fish strikes at a bait attached to the claimed apparatus, the suction effect of the fish strike pulls on the bait, which in turn pulls on the leader, which in turn pulls the displacement element and extends the element towards the fish's mouth. This extension of the displacement element creates slack in the bait's tension, allowing the leader and bait to extend down and be displaced into the fish's mouth. The hooks on the bait are then more likely to become securely embedded inside the fish which in turn increase the success of the angler using the device.

In some forms of the claimed invention, over-extension of the displacement element can permanently damage the displacement element. To avoid this negative side-effect an optional form of the claimed invention exists where the apparatus's body is shaped in a fashion that stops the displacement element from over-extending during a strike. This extension-stop prevents damage to the displacement element during use of the apparatus.

BRIEF DESCRIPTION OF THE DRAWINGS

In the accompanying drawings forming part of the specification, in which like numerals are employed to designate like parts throughout the same.

FIG. 1 shows the displacement element of the apparatus in a resting state compared to a tensioned state of the displacement element simulating a strike;

FIG. 10 is a cross-sectional view of the apparatus of FIG. 6, taken along view plane 10-10 in FIG. 6;

FIG. 11 is a cross-sectional view of the apparatus of FIG. 6, taken along view plane 11-11 in FIG. 6;

FIG. 12 is a fragmentary, right-side elevation view of another embodiment of an apparatus according to the present invention, and FIG. 12 shows indicia on the housing for assisting in the pre-tensioning of the displacement element;

FIG. 13 is a fragmentary, right-side elevation view of the apparatus of FIG. 12, and FIG. 13 shows the displacement element in a pre-tensioned state;

FIG. 14 is a right-side elevation view of another embodiment of an apparatus of the present invention, wherein the strike assist device has been integrated into the body of a fishing bait with optional fishing hooks attached thereto.

DETAILED DESCRIPTION OF THE PREFERRED EMBODIMENTS

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New strike assist devices, apparatuses, and methods for allowing baits to be displaced at strike are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description contained herein.

Figures 1, 1A, 2, 3, 4:
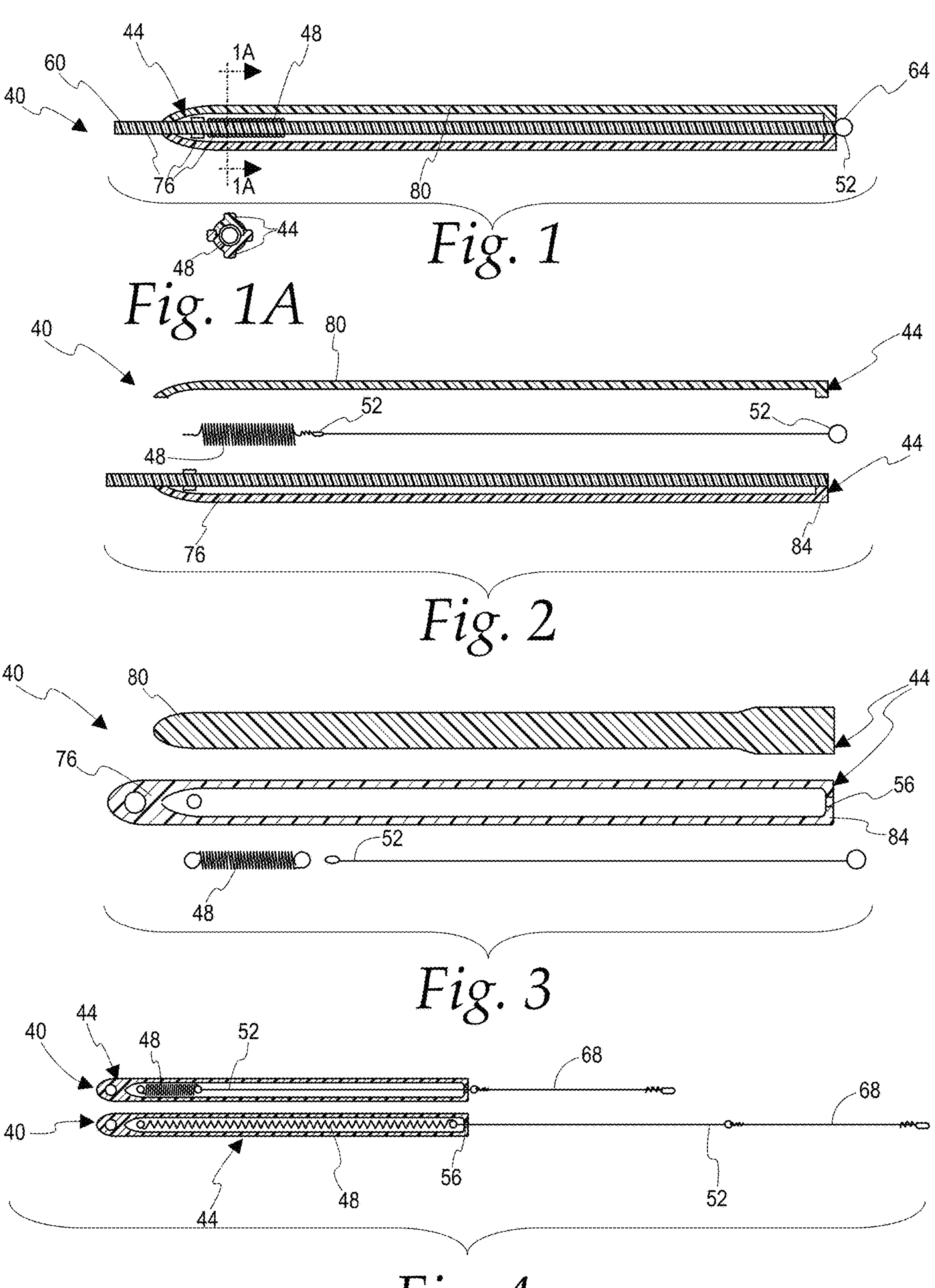
FIG. 1 is a right-side elevation view of a first embodiment of an apparatus according to the present invention, the left-side view being a mirror image thereof.
FIG. 1A is a front elevation view of the apparatus of FIG. 1.
FIG. 2 is an exploded, right-side elevation view of the apparatus of FIG. 1.
FIG. 3 is an exploded; top plan view of the apparatus of FIG. 1.
FIG. 4 is a top plan view of the apparatus of FIG. 1 with the top cover of the housing removed.

With reference to FIGS. 1-5, a first illustrated embodiment of the apparatus of the present invention is designated by the numeral 40 and comprises three main parts: a body 44, a displacement element 48, and a leader 52. The body 44 of the apparatus 40 is a hollow housing, that has at least one opening or open end 56. A first end of the displacement element 48 is attached or fixed to the body 44 and a movable second end of the displacement element 48 is connected to the leader 52. The leader 52 preferably connects to the displacement element 48 within the hollow housing of the body 44 such that the leader 52 issues out through the open end 56 of the body 44 (as shown in FIG. 4). Alternatively, the second end of the displacement element 48 may connect to the leader 52 outside of the body 44 such that the displacement element 48 extends through the open end 56 of the body 44 (not illustrated). When properly constructed, this results in a "leader" or distal end 64 and an opposing "body" or proximal end 60 to the apparatus 40. The displacement element 48 allows the suction effect of a fish strike to pull the leader end 64 and body end 60 away from each other to suck the bait into the fish's mouth and hook it.

Figures 5, 6, 7, 8, 9:
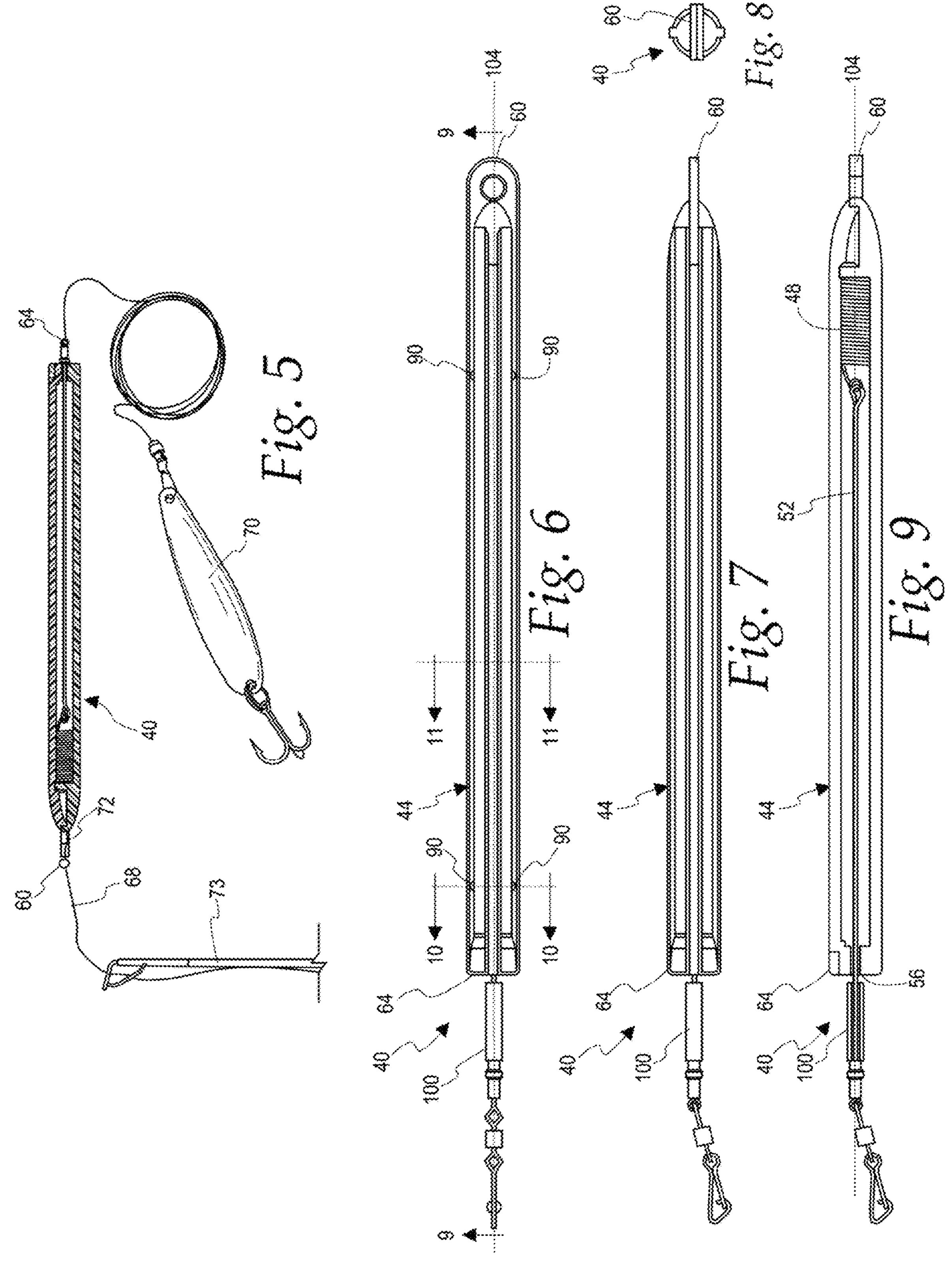
FIG. 5 shows another embodiment of an apparatus of the present invention attached to a fishing pole via a fishing line and a lure to demonstrate one manner in which the apparatus might be used while fishing.
FIG. 6 top plan view of yet another embodiment of an apparatus of the present invention assembled with a pre-tensioning device in the form of a friction sleeve that may slide along the leader to pre-tension the displacement element (which is shown in a resting state)
FIG. 7 is a left-side elevation view of the apparatus of FIG. 6, the right-side elevation view being a mirror image thereof.
FIG. 8 is a front elevation view of the apparatus of FIG. 7.
FIG. 9 is a cross-sectional view of the apparatus of FIG. 6, taken along view plane 9-9 in FIG. 6.
Figure 15:
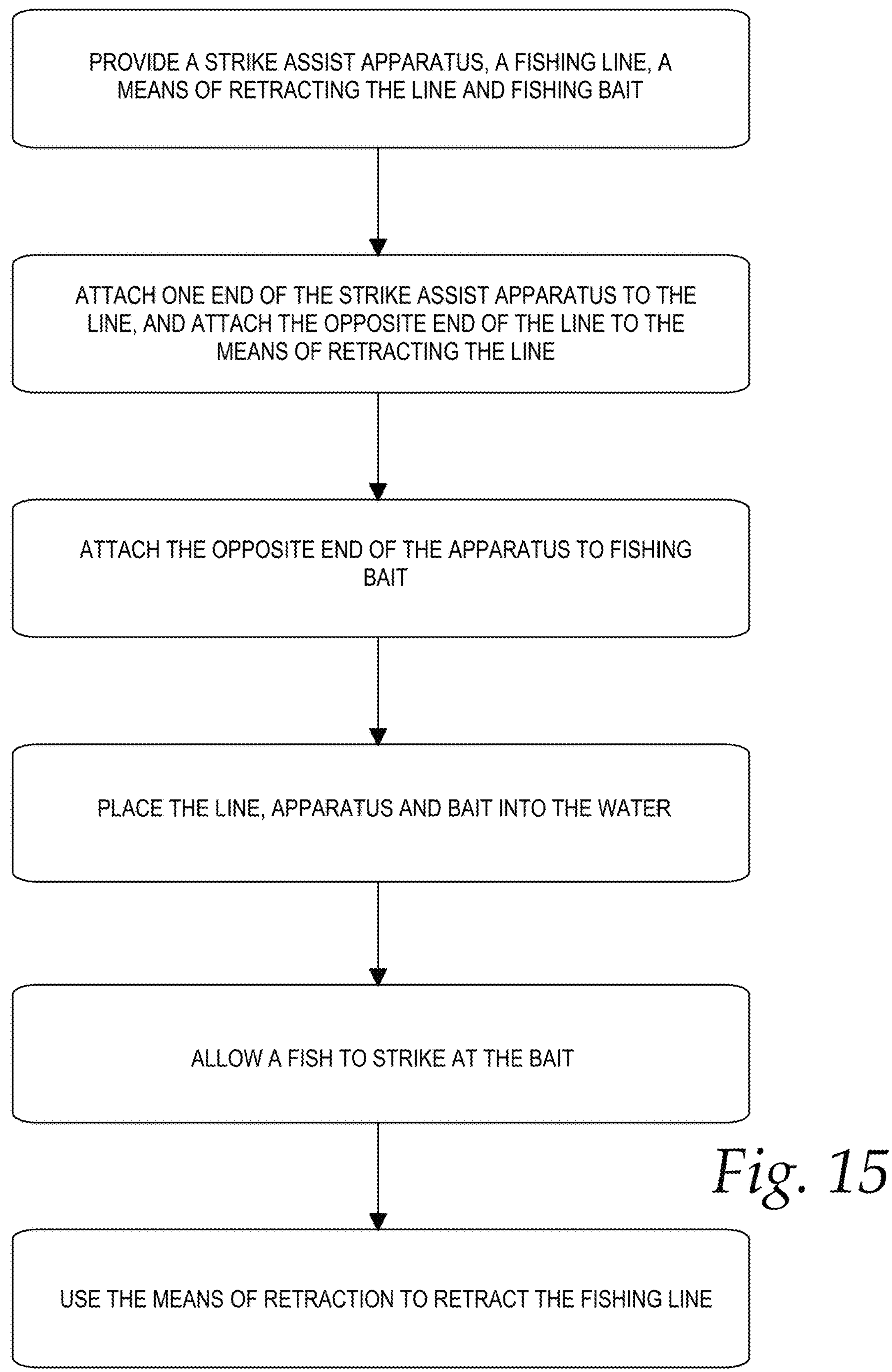
FIG. 15 is a flow diagram of one exemplary method of operating the strike assist apparatus of the present invention.

With reference to FIG. 5, when the claimed apparatus 40 is used, the body end 60 of the apparatus 40 is attached to a fishing line 68 or cable (hereinafter referred to as a "line"). The opposite leader end 64 is then attached to either fish bait or a pseudo-leader 70 which can hold bait. The leader 52 can be a thin rod, a cord, or an additional line or cable that attaches to the distal end 64 of the displacement element 48. A swivel joint may be used between the apparatus 40 and the fishing line 68, bait or pseudo-leader 70. Examples of the method of attachment between the apparatus 40 and the fishing line 68, bait, or pseudo-leader 70 include, but are not limited to: a hook; a loop; a latch; a clip; a fused line; a spliced line; a screw; a joint; a knot; a swivel-joint; or a carabiner.

In the first illustrated embodiment of the claimed invention, the body 44 is advantageously configured to prevent the movable leader end 64 of the displacement element 48 from being over-stretched and therefore damaged as illustrated in FIG. 4. The body end 60 of the apparatus 40 is configured to provide an attachment point 72 which allows the housing 44 to be connected to the fishing line 68 from the fishing pole 73 (or other device including, but not limited to a weight, diving planer, flasher/rotator, or other such fishing means or apparatus used to position the bait in the water, attract fish by adding flash, bait movement or turbulence, or aid in retracting the fish towards the fisherman) as illustrated in FIG. 5. The body 44 of the strike assist apparatus 40 must be designed with sufficient material and shape to provide the tensile strength needed to fight a fish once hooked by transferring the tensional force on the leader 52 to the fishing line 68 and/or fishing device that is towing the strike assist apparatus 40.

In the preferred embodiment of the claimed apparatus 40, the body (i.e., housing) 44 is be made from a UV-stable and resistant polycarbonate, stainless steel, titanium, or aluminum. However, the body 44 may alternatively be made from any one or any combination of other materials such as, but not limited to metal, metal alloys, plastic, wood, fiberglass, foam, and rubber.

The body 44 may be made from a single piece of material as a unitary construction, or may be made from several separate components that combine to form the body 44 and surround the displacement element 48. In the first illustrated embodiment of the apparatus 40 as shown in FIGS. 2 and 3, the body 44 separates into a bottom piece 76 and a top piece 80 to allow easy access to the displacement element 48 for maintenance and modification.

As shown in FIGS. 2 and 3, the leader end 64 of the apparatus 40 may be configured to contain a hollow wear-sleeve 84 around the body cavity's opening 56 through which the leader 52 passes. This wear-sleeve 84 prevents or minimizes the body 44 from being worn due to friction caused by relative movement of the leader 52 and the body 44. The wear-sleeve 84 may be comprised of the same material as the apparatus body 44, or of a different, more wear-resistant material like, but not limited to, metal, nylon, Ultra High Molecular Weight Polyethylene (UHMW), polymers, ceramics, and carbide. The wear-sleeve 84 may be permanently affixed to the body 44, or may be removeable from the body 44 for easy replacement when damaged.

In an optional variation of the claimed invention, the body 44 could also attach to, or be incorporated into, various other fishing devices including but not limited to such devices as diving planers (like dipsy divers, deeper divers, jet divers), lure/bait bodies, floats/bobbers, rotators/flashers (like spin doctors, dodgers, fish flashes), weights, fishing swivel, or other similar fishing devices.

Another alternative variation of the claimed invention exists where the body 44 of the device 40 serves simultaneously as a strike assist apparatus and as fishing bait. In this bait-body embodiment, the strike assist body 44 is attached to or becomes the bait which attracts fish. The body 44 may also optionally be attached to or be a part of at least one fishing hook 82. This bait-body variation is shown in FIG. 14. It can optionally be operated by inverting the strike assist apparatus and attaching the leader 52 of the apparatus 40 to the fishing line 68.

Other embodiments of a strike assist device may not include any body at all depending on the configuration of the other elements comprising that embodiment of the device.

The displacement element 48 may be any suitable device that would allow the bait to be displaced, relative to the housing 44, towards the fish's mouth at strike. In the preferred embodiment of the claimed invention, a stainless-steel metal extension spring is used as the displacement element 48. However, other types of displacement elements 48 are also contemplated for use in the claimed apparatus 40. Examples of these alternative displacement elements 48 include, but are not limited to: springs made from other materials like non-stainless metals or polymers, other types of springs (like, but not limited to compression, torsion, disk, laminated, conical, helical, and coil springs), elastic devices (like, but not limited to rubber bands, bungies, and stretch cords), electromagnets, electronic releases paired with a force meter, magnets, friction-based releases, materials calibrated to release or break when experiencing a specific force, or other such devices allowing extension and displacement upon application of a force resulting from a fish strike. If the displacement element 48 is a compression spring, then a series of holes spaced apart on the proximal end 60 of the body 44 could allow pre-tension by pulling on the leader to compress the spring (pulling away from the proximal end), inserting a pin into the desired hole and then releasing the tension on the leader 52. The compression spring would then extend until it contacted the pin which would keep the spring compressed to the desired amount of pre-tension.

The displacement element 48 should have a spring rate that allows the element 48 to be stretched due to an increase in drag force exerted on the spring when a fish strike increases the velocity of the water relative to the bait. When the fish strikes the bait that is attached indirectly or directly to the leader 52, the suction of the water increases the drag force experienced by the bait, causing the spring to be stretched, therefore allowing all elements attached to the leader end 64 of the apparatus 40 to be displaced towards the fish's mouth.

In its preferred embodiment of the apparatus 40 of the present invention, the leader 52 is composed of stainless steel. However, other substances, like metals or polymers, are suitable materials for alternative forms of the claimed invention. Regardless of the material composition of the leader 52, the leader 52 must have enough tensile strength to withstand the forces generated by towing the lure and/or by a fish that has been hooked. The end of the leader opposite displacement element 48 possesses a means (as described above with respect to other attachment means used in the apparatus 40) to attach a bait or pseudo-leader either directly or indirectly.

While preferred materials for elements have been described, the device 40 is not limited by these materials. Metal, metal alloys, plastic, wood, fiberglass, foam, rubber, and other materials may comprise some or all of the elements of the strike assist device 40 in various embodiments of the present invention.

FIGS. 2 and 3 depict exploded perspective views of the first illustrated embodiment of the device 40, and in particular show how the distal end of the spring or displacement element 48 may attach to the proximal end of the leader 52.

As shown in FIG. 5, the claimed apparatus 40 is used by attaching the body end 60 of the apparatus 40 to a fishing line or cable 68 that is itself attached to a method of retracting the line 68. Most commonly, the method of line retraction is a fishing reel 73, but motors or other means of retracting lines are also covered by the claimed invention. The opposite leader end 64 of the apparatus 40 is then attached to either fish bait or a pseudo-leader 70 which can hold bait. The fishing line 68 and apparatus 40 are placed or cast into water, and the user waits for a fish to strike at the bait. When the strike occurs, the claimed invention allows the suction from the fish strike to pull the bait into the fish's mouth where the bait hooks the fish. The user of the apparatus 40 then retracts the fishing line using the method of retraction until the fish is caught and pulled from the water.

With reference now to FIGS. 6-11, another illustrated embodiment of the apparatus according to the present invention is designated with the numeral 40. The apparatus 40 illustrated in these figures shows a presently preferred embodiment of the invention. As can best be seen in FIG. 10, the housing 44 is provided with one or more vent holes or flow ports 90, preferably located in a symmetric, opposing fashion at a location that is spaced lengthwise along the central axis 104 of the housing 44 from the distal opening 56. The flow ports 90 permit flow of water to freely enter and exit through the housing 44. This flow water prevents air from becoming trapped inside of the apparatus 40 when the apparatus is submerged in water, which would negatively affect overall density and buoyancy of the apparatus 40. At strike, the proximally-located flow ports 90 allow water to enter the inside of the hollow housing 44, and the distally-located flow ports 90 allow water to escape the inside of the housing 44 to ensure an un-impeded displacement of water and the interior components at strike.

The housing 44 is elongate, permitting the spring or displacement element 48 to stretch at least two times its resting length along the central axis 104 of the apparatus 40. More preferably, the housing 44 is configured to permit the displacement element 48 to stretch to at least four times its resting length.

Referring now to FIGS. 6 and 7, the apparatus 40 may be optionally provided with a pre-tension device 100 that permits a user to elongate the displacement element or spring 48 to a predetermined length while trolling bait. The pre-tension device 100 has the form of a rubber insert inside a hollow sleeve to create enough friction so that the when the device 100 is moved along the length of the leader 52 it stays in place—keeping the desired amount of pre-tension on the displacement element 48. The inventor has found that some baits will generate a variable drag force when trolling, such as side to side action, and the displacement element 48 can affect the "action" of the lure in a negative manner. The inventor believes that oscillation of the displacement element 48 in response to the variable drag force was reducing or dampening the lure action resulting in making fish less likely to strike the bait. The pre-tension device 100 mitigates the unwanted oscillation to improve chances of a strike. The pre-tension device 100 may also function by providing different lengths of pre-tension devices 100 corresponding to different elongations of the displacement element 48 (e.g., 1", 2", 3", etc.).

With reference to FIGS. 12 and 13, it is preferable that at least some portion of the housing 44 is transparent to permit a user to see the extension of the displacement element 48 within the cavity of the housing 44. Furthermore, the housing 44 preferably has indicia 110 at pre-determined locations to indicate to a user the elongation of the displacement element 48 when using a pre-tension device 100. Pre-tensioning of the apparatus 40 may be determined based on the trolling speed and the type of lure connected to the distal end of the apparatus 40 as described above.

It will be understood that in the broadest concept of the present invention the housing 44 need not be transparent. For example, if the housing were to be opaque or colored, then a set of different length pre-tensioners may be provided with indicia, colors, or other means to differentiate amount of elongation of the displacement apparatus 40 within the housing 44 when using a given pre-tensioning device 100.

In one presently preferred form of the invention, the displacement element 48 has a spring rate of 0.11, 0.23, or 0.47 Newtons/inch with a minimum safe travel of about 6.50 inches. This selection of spring rates accommodates a drag force range of 0.02 Newtons generated by the lowest drag bait trolled at 1.0 mph to over 10 Newtons of predicted force generated by the highest drag force bait experiencing 7 mph of relative water velocity at strike. It will be understood that other springs having different spring rates and safe extension distances could be utilized to accommodate the full range of common trolling baits and speeds. For example, springs with significantly higher spring rates may be used for shorter safe extension distances. Conversely, springs may be selected with lower spring rates for greater safe extension distances.

While the present invention in the preferred embodiments has been configured to allow a bait to be displaced when a fish strikes, there are additional applications for this invention outside the fishing industry where the displacement of an object would be desirable when there is a change in drag force. There may be instances where this invention could be used to cause displacement of an object when the drag force decreases. There may be instances where this invention could be used to allow displacement of an object in fluids other than water and in scenarios that did not include fishing.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An apparatus for fishing, wherein the apparatus comprises:

a hollow housing with a proximal end terminating in a means of attachment to a fishing line, and an opposite, distal end which terminates in an opening into an interior of said hollow housing;

a displacement element located at least partly inside said interior of said hollow housing, wherein said displacement element has a first end located inside said interior of said hollow housing that attaches to said housing, and an opposite, second end that is attached to a leader and either i) lies within said interior of said hollow housing or ii) is located outside of said hollow housing, wherein said displacement element partially or wholly extends to allow a suction of a fish strike to pull a bait into a mouth of the fish, said displacement element comprising a spring having a spring rate of between 0.11 Newtons/inch and 0.47 Newtons/inch;

wherein said leader has a means for attachment to a pseudo-leader, fishing line, or fishing bait; wherein said hollow housing includes a top piece and a bottom piece, said hollow housing has at least one flow port that is spaced from said opening and that runs from an outside of the housing into said interior of said hollow housing; and wherein said at least one flow port is defined between said top piece and said bottom piece and is defined by a concave surface of said bottom piece that extends radially outwardly beyond said top piece, relative to a central axis of said hollow housing.

2. The apparatus of claim 1, wherein said displacement element is a stainless-steel extension spring wholly retained within the hollow housing.

3. The apparatus of claim 1, wherein said second end of said displacement element protrudes out from said open end of said housing before attaching to said leader.

4. The apparatus of claim 1, further comprising a means to stop said displacement element from over-extending.

5. The apparatus of claim 1, wherein said opening into said interior of said hollow housing is covered by a wear-sleeve.

6. The apparatus of claim 1 further comprising a means for pre-tensioning said displacement element.

7. The apparatus of claim 6 wherein said pre-tensioning means is selected from one of: a friction sleeve; a friction tube; a friction bead; or a spacer which attaches to said leader and tensions said displacement element prior to use of the apparatus.

8. The apparatus of claim 1, wherein said hollow housing has a length that is at least two times larger than an un-extended length of said displacement element.

9. The apparatus of claim 1, wherein at least a portion of said hollow housing is transparent, and said displacement element is visible through said portion of said hollow housing.

10. The apparatus of claim 1, wherein at least a portion of said hollow housing is marked, shaped, or inscribed with distance measurement indicia which indicate a degree to which said displacement element has been extended.

11. The apparatus of claim 1, wherein said means for attachment to a pseudo-leader, fishing line, or fishing bait are selected from the group consisting of: a swivel-joint.

12. An apparatus for fishing, wherein the apparatus comprises:

a hollow housing with a proximal end terminating in a means of attachment to a fishing line, and an opposite, distal end which terminates in an opening into an interior of said hollow housing;

a displacement element located at least partly inside said interior of said hollow housing, wherein said displacement element has a first end located inside said interior of said hollow housing that attaches to said housing, and an opposite, second end that is attached to a leader and either i) lies within said interior of said hollow housing or ii) is located outside of said hollow housing, wherein said displacement element partially or wholly extends to allow a suction of a fish strike to pull a bait into a mouth of the fish;

wherein said leader has a means for attachment to a pseudo-leader, fishing line, or fishing bait; and wherein said displacement element comprises a spring having a spring rate accommodating a drag force range of between 0.02 Newtons generated by a fishing bait trolled at 1.0 mph to 10 Newtons generated by said fishing bait experiencing 7 mph of relative water velocity at strike; wherein said hollow housing includes a top piece and a bottom piece, said hollow housing has at least one flow port that is spaced from said opening and that runs from an outside of the housing into said interior of said hollow housing; and wherein said at least one flow port is defined between said top piece and said bottom piece and is defined by a concave surface of said bottom piece that extends radially outwardly beyond said top piece, relative to a central axis of said hollow housing.

13. A method of catching fish, said method comprising the steps of:

providing the apparatus of claim 1, the fishing line operably connected to a means of retracting said fishing line, and the fishing bait;

attaching said first end of said hollow housing to said fishing line;

attaching said leader to said fishing bait;

placing said fishing line, said apparatus, and said fishing bait into water;

allowing a fish to strike at said fishing bait; and operating said means of retraction to retract said fishing line.

14. The method of claim 13, wherein said means for attachment to a pseudo-leader, fishing line, or fishing bait partially or wholly extends relative to said hollow housing to allow the suction of the fish strike to pull said fishing bait into the mouth of the fish.

15. The method of claim 13 further comprising the steps of:

providing a means of pre-tensioning said displacement element; and using said means of pre-tensioning said displacement element before placing said apparatus in water.

* * * * *